(12) United States Patent
Bird et al.

(10) Patent No.: US 9,441,874 B2
(45) Date of Patent: Sep. 13, 2016

(54) WATER HEATER ASSEMBLY FOR A REFRIGERATOR APPLIANCE AND A METHOD FOR OPERATING THE SAME

(71) Applicant: General Electric Company, Schenectady, NY (US)

(72) Inventors: Christian Francis Bird, Louisville, KY (US); Bradley Nicholas Gilkey, Louisville, KY (US); Robert Lee Lewis, Jr., Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 278 days.

(21) Appl. No.: 14/054,060

(22) Filed: Oct. 15, 2013

(65) Prior Publication Data

US 2015/0101670 A1  Apr. 16, 2015

(51) Int. Cl.
*A47J 31/46* (2006.01)
*F25D 23/12* (2006.01)

(52) U.S. Cl.
CPC .............. *F25D 23/12* (2013.01); *A47J 31/465* (2013.01); *F25D 2400/02* (2013.01); *Y10T 137/0318* (2015.04); *Y10T 137/6416* (2015.04)

(58) Field of Classification Search
CPC ..... F25D 2400/02; A47J 31/465; B67D 7/80

USPC .................................................. 137/192, 210
See application file for complete search history.

(56) References Cited

U.S. PATENT DOCUMENTS

| | | | |
|---|---|---|---|
| 3,898,853 A * | 8/1975 | Iung | 62/50.1 |
| 4,742,842 A * | 5/1988 | Garneau et al. | 137/172 |
| 4,922,943 A * | 5/1990 | Gill | 137/1 |
| 5,020,565 A * | 6/1991 | Hattori et al. | 137/207 |
| 5,415,196 A * | 5/1995 | Bryant et al. | 137/14 |
| 6,382,929 B1 * | 5/2002 | Di Benedetto | 417/307 |
| 7,412,987 B2 * | 8/2008 | Kemper et al. | 137/192 |
| 7,610,849 B2 * | 11/2009 | Bigge et al. | 99/290 |
| 8,083,104 B2 * | 12/2011 | Roetker et al. | 222/146.1 |
| 2005/0284304 A1 * | 12/2005 | Kobylarz | 99/283 |
| 2006/0196363 A1 * | 9/2006 | Rahn | 99/279 |
| 2007/0251261 A1 | 11/2007 | Son et al. | |
| 2009/0165494 A1 * | 7/2009 | Muthumani et al. | 62/390 |
| 2013/0108249 A1 * | 5/2013 | Krause et al. | 392/465 |

* cited by examiner

*Primary Examiner* — Kevin Murphy
(74) *Attorney, Agent, or Firm* — Dority & Manning, P.A.

(57) ABSTRACT

A refrigerator appliance and a method for operating a water heating assembly of the same are provided. The method includes operating a heating element of the water heating assembly to generate heated water. To dispense the heated water, an air valve of the water heating assembly is closed and an air pump of the water heating assembly is worked. In such a manner, heated water can be dispensed accurately and/or precisely.

11 Claims, 9 Drawing Sheets

WATER HEATER ASSEMBLY FOR A REFRIGERATOR APPLIANCE AND A METHOD FOR OPERATING THE SAME

FIELD OF THE INVENTION

The present subject matter relates generally to refrigerator appliances, such as refrigerator appliances with water heating assemblies, and methods for operating water heating assemblies of refrigerator appliances.

BACKGROUND OF THE INVENTION

Certain refrigerator appliances include a dispenser for directing ice from the refrigerator's ice maker and/or liquid water to the dispenser. A user can activate the dispenser to direct a flow of ice or liquid water into a cup or other container positioned within the dispenser. Liquid water directed to the dispenser is generally chilled or at an ambient temperature. However, certain refrigerator appliances also include features for dispensing heated liquid water.

Heated liquid water can be used to make certain beverages, such as coffee or tea. Refrigerators equipped to dispense heated liquid water can assist with making such beverages. However, brewing beverages with heated water can create backpressure. Such backpressure can hinder proper water flow to the dispenser and negatively affect operation of the dispenser and/or refrigerator appliance. In addition, liquid water supplied to the dispenser can be supplied at a supply pressure of a water source of the refrigerator appliance, such as a well or municipal water system. Brewing beverages with heated water at the supply pressure can be difficult due to high flow rates associated the supply pressure.

Accordingly, a refrigerator appliance with features for generating heated liquid water for brewing beverages would be useful. In particular, a refrigerator appliance with features for generating heated liquid water for brewing beverages while also supplying heated liquid water at a relatively low pressure would be useful.

BRIEF DESCRIPTION OF THE INVENTION

The present subject matter provides a refrigerator appliance and a method for operating a water heating assembly of the same. The method includes operating a heating element of the water heating assembly to generate heated water. To dispense the heated water, an air valve of the water heating assembly is closed and an air pump of the water heating assembly is worked. In such a manner, heated water can be dispensed accurately and/or precisely. Additional aspects and advantages of the invention will be set forth in part in the following description, or may be apparent from the description, or may be learned through practice of the invention.

In a first exemplary embodiment, a refrigerator appliance is provided. The refrigerator appliance includes a cabinet that defines a chilled chamber. The chilled chamber of the cabinet is configured for receipt of food items for storage. The cabinet has a door. The door is configured for permitting selective access to the chilled chamber of the cabinet. A water heating assembly includes a tank that defines a heating chamber and an expansion chamber. The tank has a flow conduit that extends between the heating chamber and the expansion chamber. The tank also has a vent that permits air to enter and exit the expansion chamber. A check valve is positioned within the expansion chamber at an opening of the flow conduit. A heating element is mounted to the tank and is positioned within the heating chamber of the tank. An air valve is coupled to the expansion chamber of the tank. The air valve is configured for selectively adjusting between an open configuration and a closed configuration. The air valve permits a flow of air through the vent when the air valve is in the open configuration. The air valve obstructs the flow of air through the vent when the air valve is in the closed configuration. An air pump is configured for selectively directing air into the expansion chamber. The refrigerator appliance also includes an inlet conduit that is configured for directing liquid water into the heating chamber of the tank and an outlet conduit that is configured for directing liquid water out of the heating chamber of the tank.

In a second exemplary embodiment, a method for operating a water heating assembly of a refrigerator appliance is provided. The method includes operating a heating element of the water heating assembly in order to heat water within a heating chamber of the water heating assembly. Water within the heating chamber flows into an expansion chamber of the water heating assembly during the step of operating due to expansion of water within the heating chamber. The method also includes closing an air valve of the water heating assembly such that the air valve obstructs air flow out of the expansion chamber through the air valve and working an air pump of the water heating assembly in order to direct air into the expansion chamber after the step of closing the air valve. The air within the expansion chamber urges water out of the expansion chamber during the step of working.

In a third exemplary embodiment, a method for operating a water heating assembly of a refrigerator appliance is provided. The method includes operating a heating element of the water heating assembly in order to heat water within a heating chamber of the water heating assembly. Water within the heating chamber flows into an expansion chamber of the water heating assembly during the step of operating due to expansion of water within the heating chamber. The method also includes selecting a heated water dispense or a brewed beverage dispense. A water valve of the water heating assembly is opened such that the water valve permits a flow of water into the heating chamber through the water valve if the heated water dispense is selected at the step of selecting. Heated water within the heating chamber flows out of the heating chamber when the water valve is open. An air valve of the water heating assembly is closed such that the air valve obstructs air flow out of the expansion chamber through the air valve and an air pump of the water heating assembly is worked in order to direct air into the expansion chamber after the step of closing the air valve if the brewed beverage dispense is selected at said step of selecting. The air within the expansion chamber urges water out of the expansion chamber while the air pump is working.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
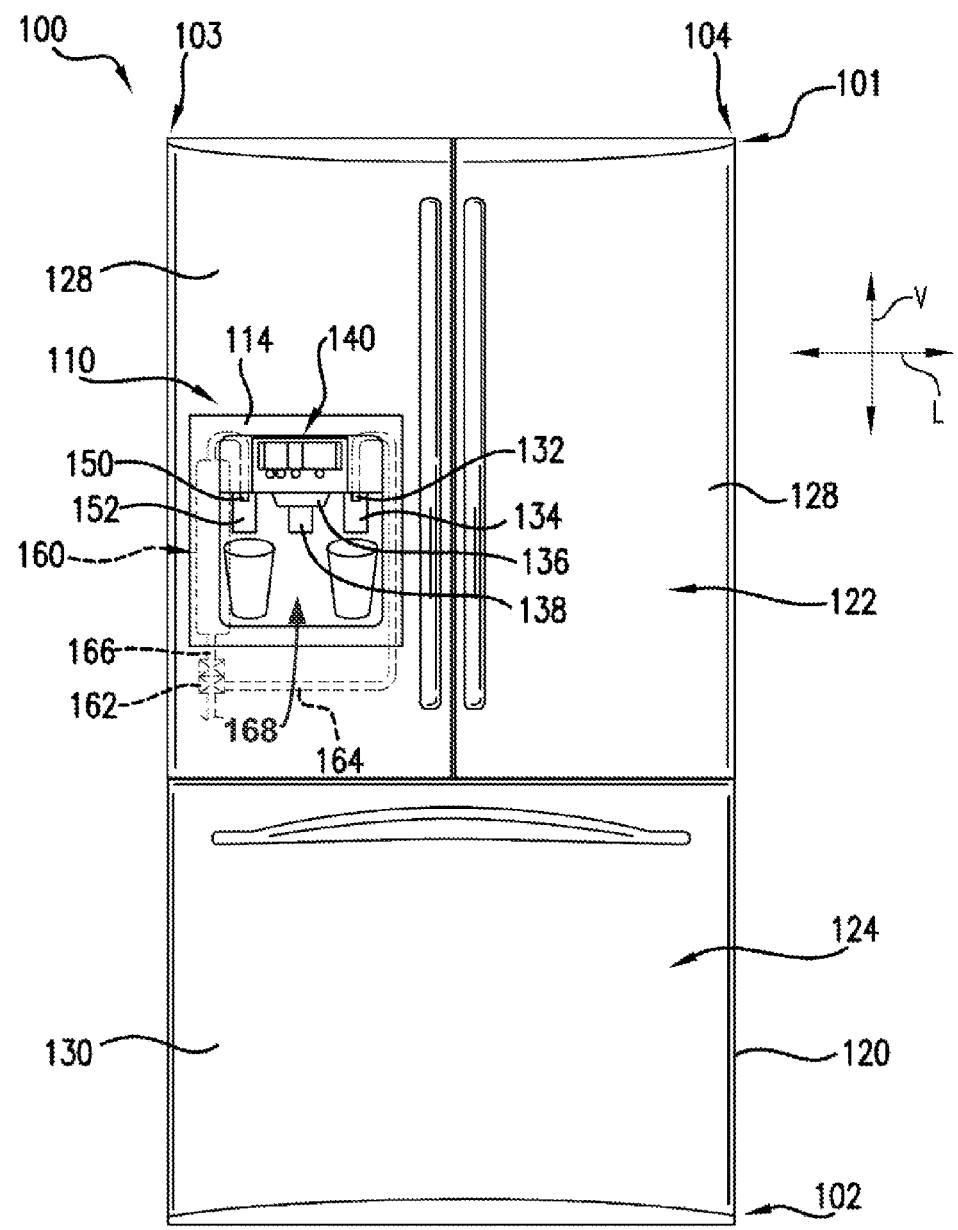
FIG. 1 provides a front, elevation view of a refrigerator appliance according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a front, elevation view of a refrigerator appliance 100 according to an exemplary embodiment of the present subject matter. Refrigerator appliance 100 includes a cabinet or housing 120. Housing 120 extends between an upper portion 101 and a lower portion 102 along a vertical direction V and also extends between a first side portion 103 and a second side portion 104 along a lateral direction L. Housing 120 defines chilled chambers, e.g., a fresh food compartment 122 positioned adjacent upper portion 101 of housing 120 and a freezer compartment 124 arranged at lower portion 102 of housing 120. Housing 120 also defines a mechanical compartment (not shown) for receipt of a sealed cooling system for cooling fresh food compartment 122 and freezer compartment 124.

Refrigerator appliance 100 is generally referred to as a bottom mount refrigerator appliance. However, it should be understood that refrigerator appliance 100 is provided by way of example only. Thus, the present subject matter is not limited to refrigerator appliance 100 and may be utilized in any suitable refrigerator appliance. For example, one of skill in the art will understand that the present subject matter may be used with side-by-side style refrigerator appliances or top mount refrigerator appliances as well.

Refrigerator doors 128 are rotatably hinged to housing 120, e.g., at an opening 121 that permits access to fresh food compartment 122, in order to permit selective access to fresh food compartment 122. A freezer door 130 is arranged below refrigerator doors 128 for accessing freezer compartment 124. Freezer door 130 is mounted to a freezer drawer (not shown) slidably coupled within freezer compartment 124.

Refrigerator appliance 100 also includes a water-dispensing assembly 110 for dispensing liquid water and/or ice to a dispenser recess 168 defined on one of refrigerator doors 128. Water-dispensing assembly 110 includes a dispenser 114 positioned on an exterior portion of refrigerator appliance 100. Dispenser 114 includes several outlets for accessing ice, chilled liquid water, and heated liquid water. As will be understood by those skilled in the art, liquid water from a water source, such as a well or municipal water system, can contain additional substances or matter. Thus, as used herein, the term "water" includes purified water and solutions or mixtures containing water and, e.g., elements (such as calcium, chlorine, and fluorine), salts, bacteria, nitrates, organics, flavor additives and other chemical compounds or substances.

To access ice, chilled liquid water, and heated liquid water, water-dispensing assembly 110 includes a chilled water paddle 134 mounted below a chilled water outlet 132 for accessing chilled liquid water and a heated water paddle 152 mounted below a heated water outlet 150 for accessing heated liquid water. Similarly, an ice paddle 138 is mounted below an ice outlet 136 for accessing ice. As an example, a user can urge a vessel such as a cup against any of chilled water paddle 134, heated water paddle 152, and/or ice paddle 138 to initiate a flow of chilled liquid water, heated liquid water, and/or ice into the vessel within dispenser recess 168, respectively.

A control panel or user interface panel 140 is provided for controlling the mode of operation of dispenser 114, e.g., for selecting crushed or whole ice. In additional exemplary embodiments, refrigerator appliance 100 may include a single outlet and paddle rather than three separate paddles and dispensers. In such embodiments, user interface panel 140 can include a chilled water dispensing button (not labeled), an ice-dispensing button (not labeled) and a heated water dispensing button (not labeled) for selecting between chilled liquid water, ice and heated liquid water, respectively.

Outlets 132, 136, and 150 and paddles 134, 138, and 152 are an external part of dispenser 114, and are positioned at or adjacent dispenser recess 168, e.g., a concave portion defined in an outside surface of refrigerator door 128. Dispenser 114 is positioned at a predetermined elevation convenient for a user to access ice or liquid water, e.g., enabling the user to access ice without the need to bend-over and without the need to access freezer compartment 124. In the exemplary embodiment, dispenser 114 is positioned at a level that approximates the chest level of a user.

Refrigerator appliance 100 also includes features for generating heated liquid water and directing such heated liquid water to dispenser recess 168. Thus, refrigerator appliance 100 need not be connected to a residential hot water heating system in order to supply heated liquid water to dispenser recess 168. In particular, refrigerator appliance 100 includes a water heating assembly 160 mounted to housing 120. In particular, water heating assembly 160 may be positioned within refrigerator door 128 for heating water therein. Refrigerator appliance 100 includes a tee-joint 162 for splitting a flow of water. Tee-joint 162 directs water to both a heated water conduit 166 and a chilled water conduit 164.

Heated water conduit 166 is in fluid communication with water heating assembly 160 and heated water outlet 150. Thus, water from tee-joint 162 can pass through water heating assembly 160 and exit refrigerator appliance 100 at heated water outlet 150 as heated liquid water. Conversely, chilled water conduit 164 is in fluid communication with chilled water outlet 132. Thus, water from tee-joint 162 can exit refrigerator appliance 100 as chilled liquid water at chilled water outlet 132. In alternative exemplary embodiments, chilled water conduit 164 and heated water conduit 166 are joined such that chilled and heated water conduits 164 and 166 are connected in parallel or in series to each other and dispense fluid at dispenser recess 168 from a common outlet.

Figure 2:
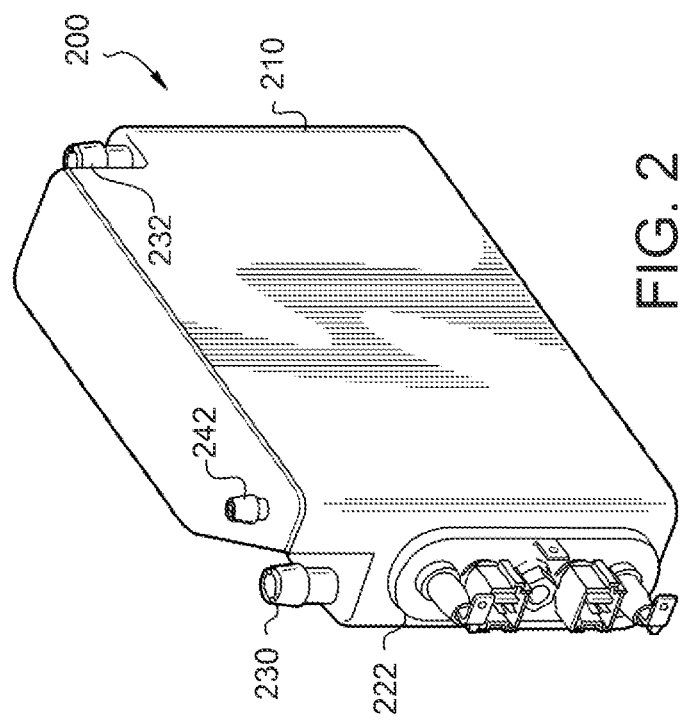
FIG. 2 provides a perspective view a water heating assembly according to an exemplary embodiment of the present subject matter.
Figure 3:
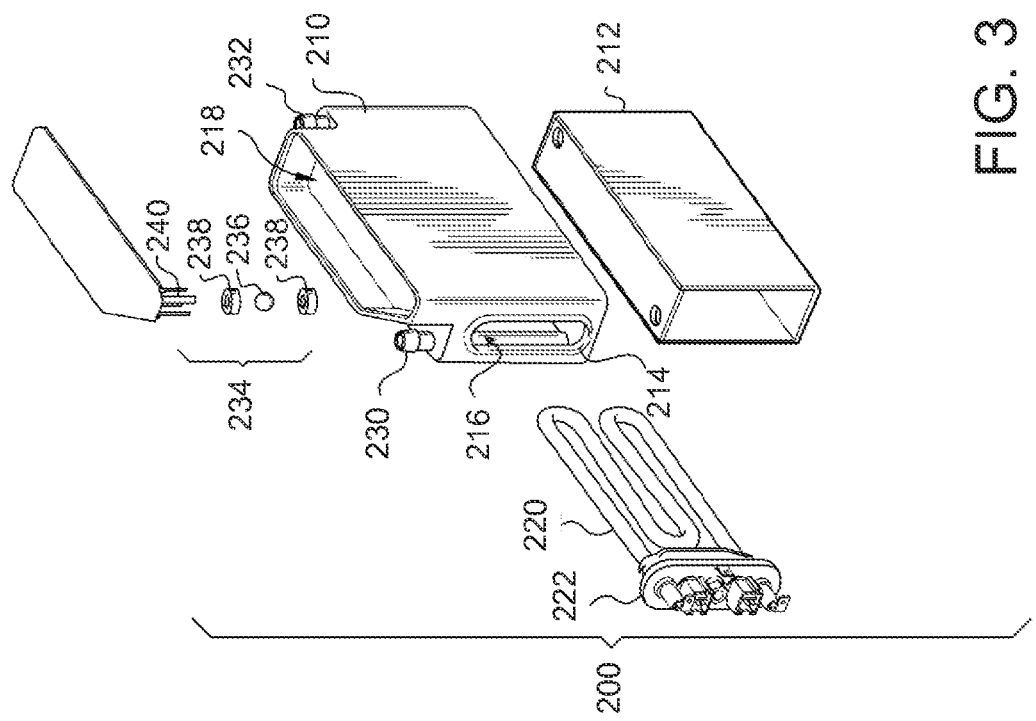
FIG. 3 provides an exploded view of the exemplary water heating assembly of FIG. 2.

FIG. 2 provides a perspective view a water heating assembly 200 according to an exemplary embodiment of the present subject matter. FIG. 3 provides an exploded view of water heating assembly 200. Water heating assembly 200 can be used in any suitable refrigerator appliance. For example, water heating assembly 200 may be used in refrigerator appliance 100 as water heating assembly 160. Water heating assembly 200 includes features for assisting with dispensing heated water, e.g., despite backpressure downstream of water heating assembly 200.

As may be seen in FIGS. 2 and 3, water heating assembly 200 includes a tank 210 and a heating element or heater 220. Tank 210 can be made of any suitable material. For example, tank 210 may be made of a plastic, such as polyethersulfone. Tank 210 may be a molded as a single, integral component or portions of tank 210 may be mounted to one another, e.g., with ultrasonic or thermal welding, etc. A metallic liner 212 may be provided or disposed within tank 210, e.g., to shield tank 210 from heater 220.

Heater 220 is mounted to tank 210, e.g., such that heater 220 is disposed within tank 210. Heater 220 includes a base 222 that is mountable to tank 210, e.g., at an opening 214 defined by tank 210. Accordingly, heater 220 and other elements attached to base 222 may be removed, e.g., for service or replacement. Heater 220 can be any suitable mechanism for heating water. For example, heater 220 may be an electric resistance heating element, a microwave element or an induction heating element.

Water heating assembly 200 also includes an inlet conduit 230 and an outlet conduit 232. Inlet conduit 230 is in fluid communication with, e.g., extends between, a water supply (not shown), such as a well or municipal water system, and tank 210. Conversely, outlet conduit 232 is in fluid communication with, e.g., extends between, tank 210 and heated water outlet 150 (FIG. 1) of refrigerator appliance 100. Thus, inlet conduit 230 directs a flow of, e.g., cold, water from the water supply into tank 210. Within tank 210, heater 220 heats such water to generate heated water, and outlet conduit 232 directs such heated water out of tank 210 to heated water outlet 150. Water heating assembly 200 also includes a check valve 234, such as a floating ball check valve. Check valve 234 includes a float body 236, seals 238 and guides 240.

Figure 4:
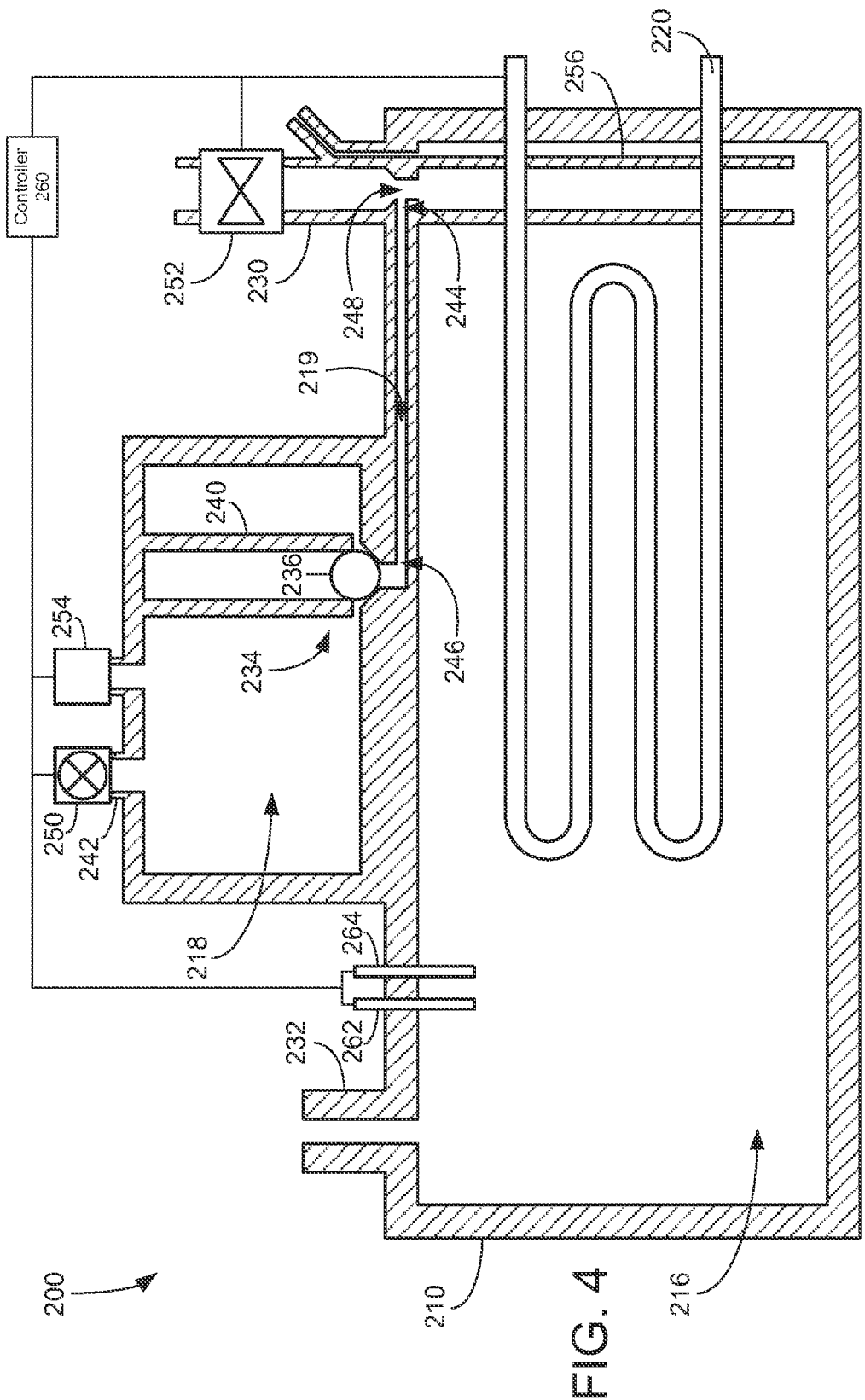
FIG. 4 provides a schematic view of the exemplary water heating assembly of FIG. 2

FIG. 4 provides a schematic view of water heating assembly 200. As may be seen in FIG. 4, tank 210 of water heating assembly 200 defines a heating chamber 216, an expansion chamber 218 and a flow conduit 219. In the exemplary embodiment shown in FIG. 4, expansion chamber 218 is positioned above heating chamber 216, e.g., along the vertical direction V. Heater 220 is positioned within heating chamber 216 and configured for heating water therein. Expansion chamber 218 is configured for receipt of water from heating chamber 218 via flow conduit 219, e.g., due to thermal expansion of liquid water in heating chamber 216 during operation of heater 220.

Flow conduit 219 extends between and fluidly connects heating chamber 216 and expansion chamber 218. In particular, flow conduit 219 extends between a first opening 244 and a second opening 246. First opening 244 of flow conduit 219 is position at or adjacent heating chamber 216 of tank 210, e.g., at a Venturi portion 248 of tank 210. Conversely, second opening 246 of flow conduit 219 is positioned at or adjacent expansion chamber 218, e.g., at check valve 234 within expansion chamber 218. Thus, water can flow between heating chamber 216 and expansion chamber 218 via or through flow conduit 219.

Tank 210 also has a vent 242. Vent is positioned at a top portion of expansion chamber 218. Vent 242 permits air to enter and exit expansion chamber 218. As discussed above, water can flow between heating chamber 216 and expansion chamber 218 via or through flow conduit 219. When water is flowing into expansion chamber 218 from heating chamber 216, air within expansion chamber 218 can exit expansion chamber 218 through vent 242, e.g., in order to avoid positively pressurizing expansion chamber 218 relative to an atmosphere around water heating assembly 200. Similarly, when water is flowing out of expansion chamber 218 to heating chamber 216, air can enter expansion chamber 218 through vent 242, e.g., in order to avoid negatively pressurizing expansion chamber 218 relative to the atmosphere around water heating assembly 200.

To regulate the flow of air through vent 242, water heating assembly 200 includes an air valve 250. Air valve 250 is coupled to expansion chamber 218. For example, air valve 250 may be mounted to tank 210 at vent 242 such that air valve 250 is coupled to expansion chamber 218. Air valve 250 is configured for selectively adjusting between an open configuration and a closed configuration. Air valve 250 permits a flow of air through vent 242 (into or out of expansion chamber 218) when air valve 250 is in the open configuration. Conversely, air valve 250 obstructs or blocks the flow of air through vent 242 when air valve 250 is in the closed configuration. In such a manner, air valve 250 can regulate airflow through vent 242 and into and out of expansion chamber 218.

As may be seen in FIG. 4, water heating assembly 200 includes a water valve 252 coupled to inlet conduit 230. In particular, water valve 252 may be mounted to inlet conduit 210 or tank 210 at or adjacent inlet conduit 230. Water valve 252 is configured for regulating a flow of water through inlet conduit 230 into heating chamber 216 of tank 210. In particular, water valve 252 is configured for selectively adjusting between an open arrangement and a closed arrangement. In the open arrangement, water valve 252 permits the flow of water into heating chamber 216 through inlet conduit 230. Conversely, water valve 252 obstructs or blocks the flow of water into heating chamber 216 through inlet conduit 230 when water valve 252 is in the closed arrangement. In such a manner, water valve 252 can regulate water flow through inlet conduit 230 into heating chamber 216.

Water heating assembly 200 also includes an air pump 254. Air pump 254 is configured for selectively directing air into expansion chamber 218. In particular, air pump 254 can urge or force air into expansion chamber 218, e.g., regardless of whether air valve 250 is opened or closed. In such a manner, air pump 254 can force water out of expansion chamber 218. As discussed in greater detail below, air from air pump 254 can displace water within expansion chamber 218 such that the water flows out of expansion chamber 218 via flow conduit 219. Air pump 254 may be mounted to tank 210, e.g., at or adjacent vent 242.

Water heating assembly 200 also includes a downspout 256. Downspout 256 is positioned within tank 210, e.g., within heating chamber 216 of tank 210. Downspout 256 receives water from inlet conduit 230 and directs such water into heating chamber 216 of tank 210. In particular, downspout 256 directs water from inlet conduit 230 to a bottom portion of heating chamber 216. In such a manner, downspout 256 can facilitate or assist thermal stratification within heating chamber 216. As may be seen in FIG. 4, inlet conduit 230 and outlet conduit 240 are positioned on opposite sides of tank 210, e.g., along the lateral direction L. Such positioning of inlet conduit 230 and outlet conduit 240 can also assist thermal stratification within heating chamber 216.

Venturi portion 248 of tank 210 is configured for generating a volume of relatively low pressure water. For example, when a flow of water enters tank 210 at inlet conduit 230. Such flow of water passes through Venturi portion 248 of tank 210. Due to the converging cross-sectional area of Venturi portion 248, a velocity of the flow of water in the Venturi portion 248 can increase while a pressure of the flow of water in the Venturi portion 248 decreases. In particular, the flow of water within Venturi portion 248 can have a pressure less than that of an atmosphere in which water heating assembly 200 is disposed. In such a manner, Venturi portion 248 can draw water out of expansion chamber 218 through flow conduit 219 when the flow of water passes through Venturi portion 248. As discussed above, air from the atmosphere in which water heating assembly 200 is disposed can also enter expansion chamber 218 through vent 242 with air valve 250 in the open configuration, e.g., to permit the flow of water out of expansion chamber 218 due to Venturi portion 248.

Operation of water heating assembly 200 and/or refrigerator appliance 100 is controlled by a processing device or controller 260 that is operatively coupled to control panel 140 for user manipulation to select water heating and dispensing operations and features. In response to user manipulation of control panel 140, controller 260 operates the various components of water heating assembly 200 and/or refrigerator appliance 100 to execute selected machine cycles and features.

Controller 260 may include a memory and microprocessor, such as a general or special purpose microprocessor operable to execute programming instructions or microcontrol code associated with water heating cycles. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 260 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 108 and other components of water heating assembly 200 and/or refrigerator appliance 100 may be in communication with controller 260 via one or more signal lines or shared communication busses. Controller 260 is operatively coupled to or in communication with heater 220, air valve 250, water valve 252 and air pump 254.

Water heating assembly 200 also includes water level sensor 262 and a temperature sensor 264. Controller 260 is in communication with water level sensor 262 and temperature sensor 264. Based upon respective signals from water level sensor 262 and temperature sensor 264, controller 260 can determine or establish a level of water in heating chamber 216 and a temperature of water in heating chamber 216.

Water level sensor 262 is disposed within heating chamber 216 of tank 210, e.g., and is mounted to tank 210. Water level sensor 262 is configured for measuring of detecting a level or height of water in heating chamber 216. For example, water level sensor 262 can actuate when water reaches a certain predefined height in heating chamber 216. Water level sensor 262 can be any suitable sensor for measuring or determining the height of water in heating chamber 216. For example, water level sensor 262 may be a float switch, a series of continuity probes, an optical or IR sensor, etc.

Water temperature sensor 264 is disposed adjacent or within heating chamber 216 of tank 210, e.g., and is mounted to tank 210. Water temperature sensor 264 is configured for measuring of detecting a temperature of water in heating chamber 216. Water temperature sensor 264 can be any suitable sensor for measuring or determining the temperature of water in heating chamber 216. For example, water temperature sensor 264 may be a thermocouple, a thermistor, a thermostat, etc.

Figure 5:
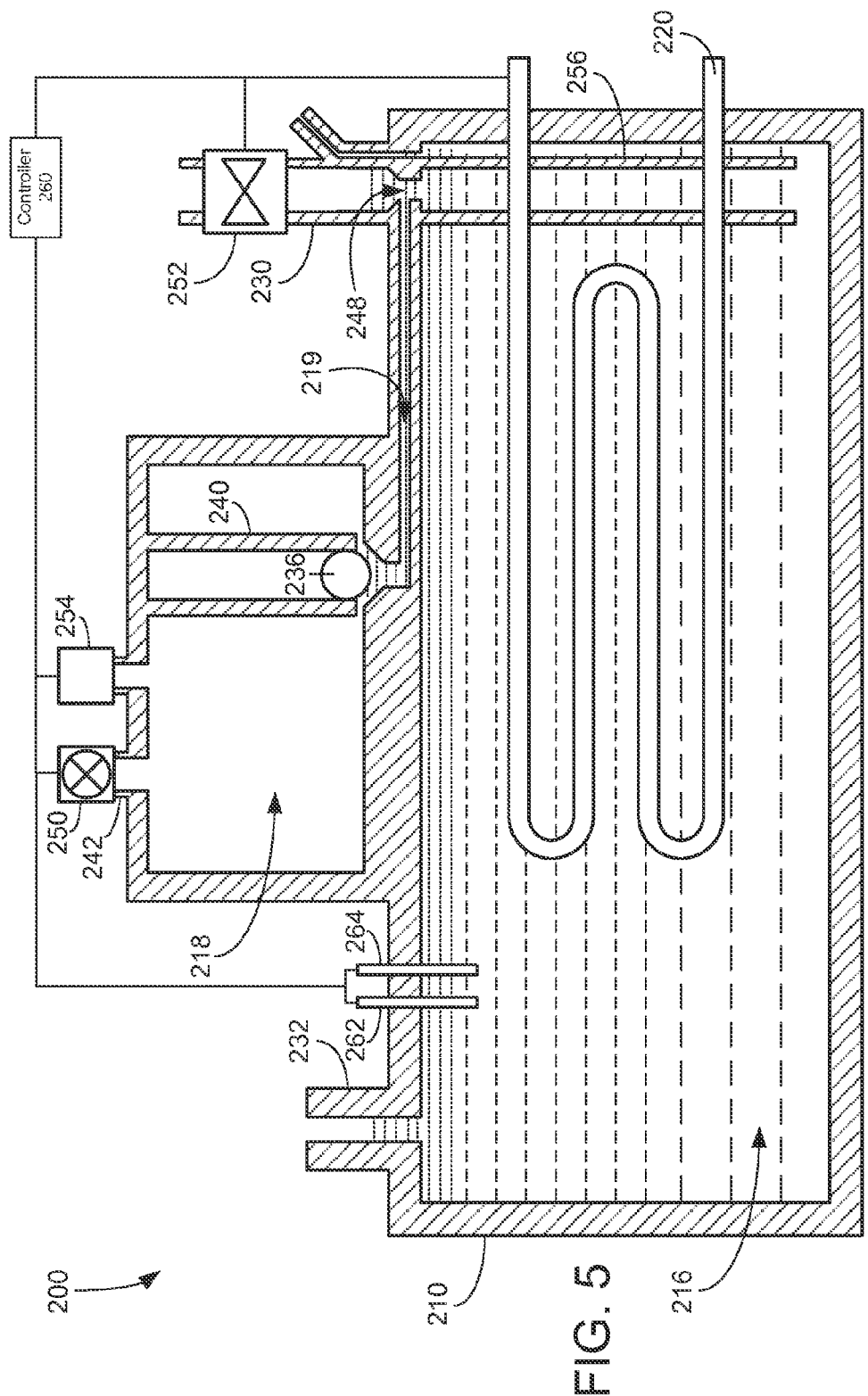
FIGS. 5, 6 and 7 provide schematic views of a dispensing operation of the exemplary water heating assembly of FIG. 2.
Figure 6:
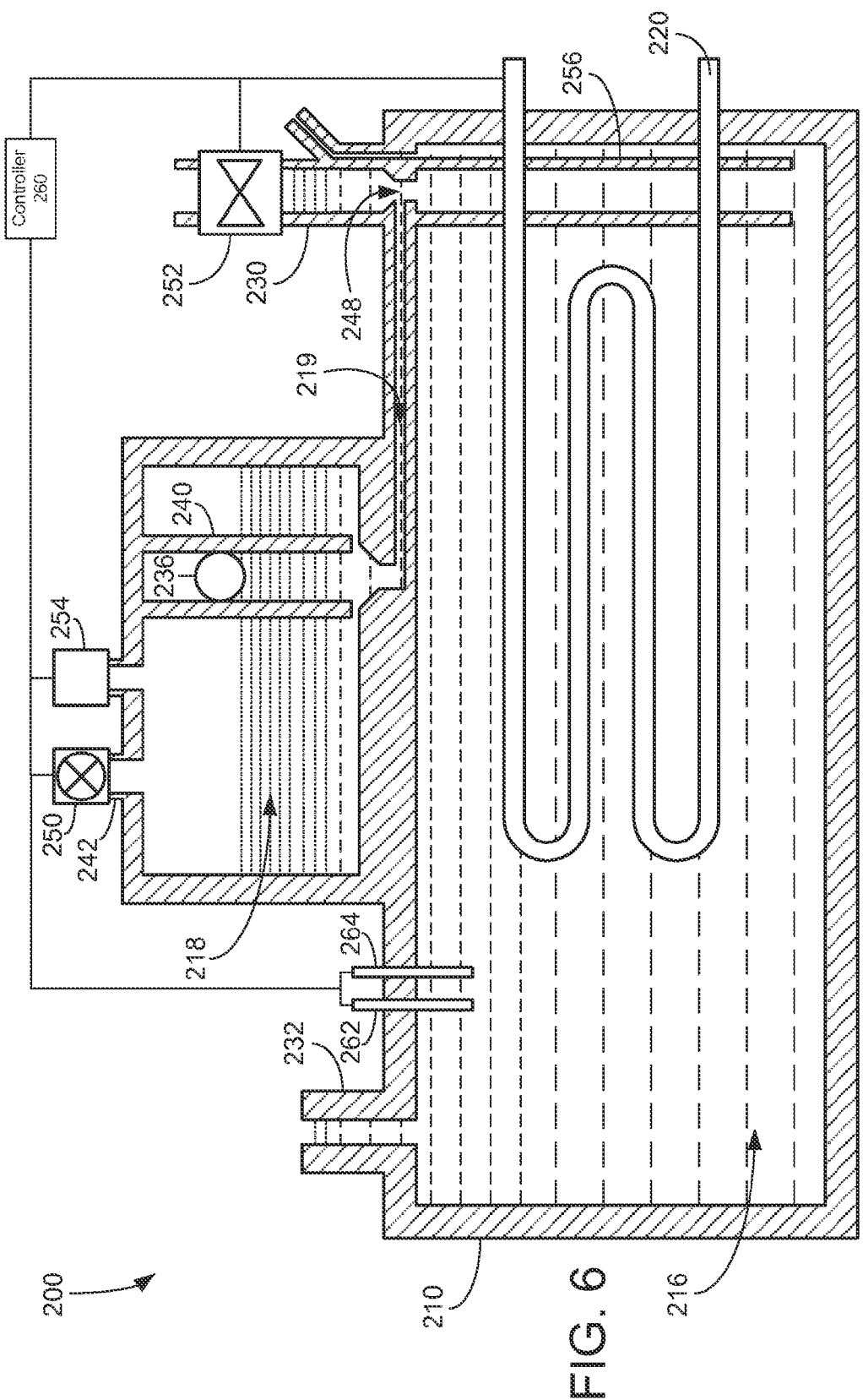
Figure 7:
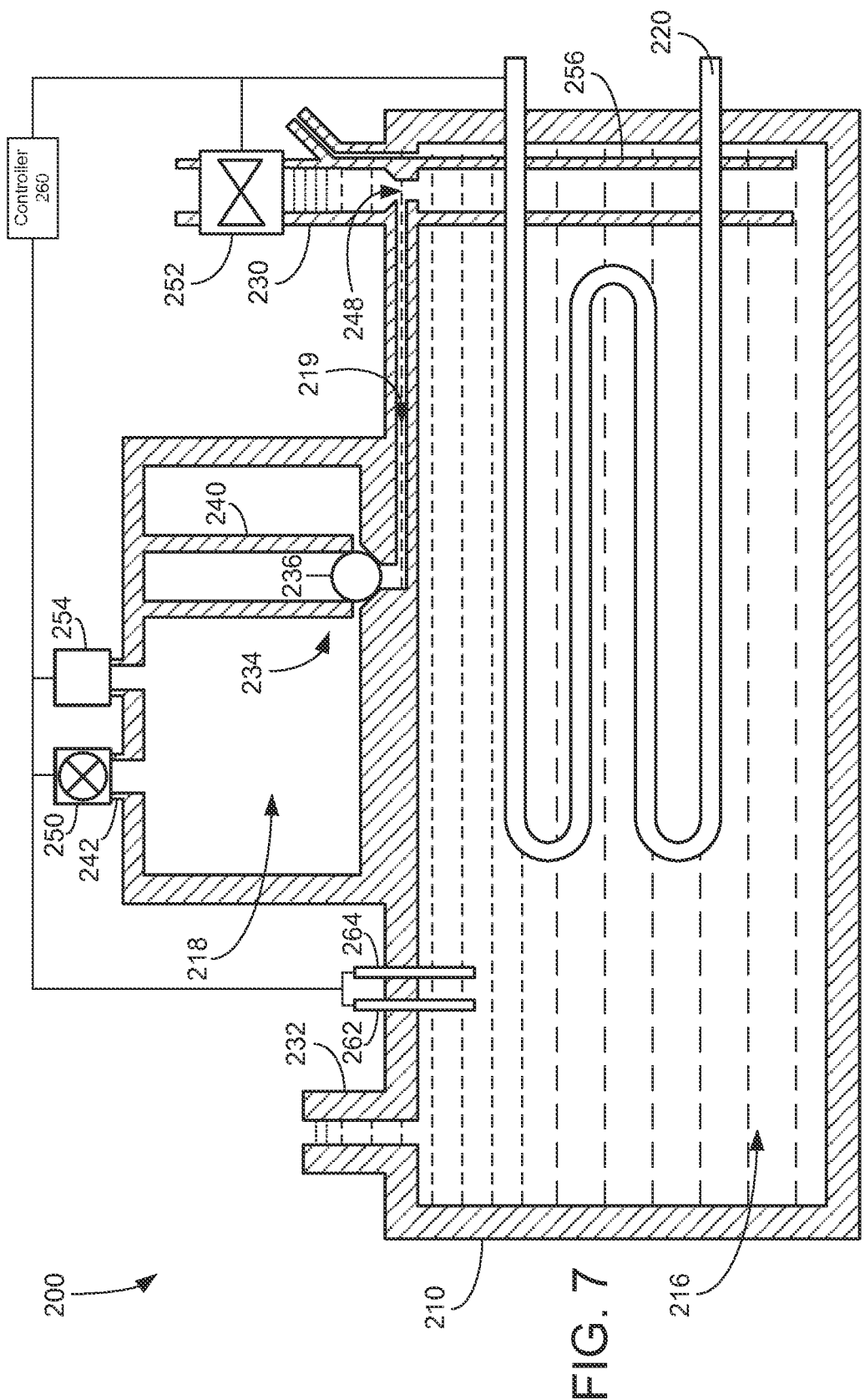
Figure 9:
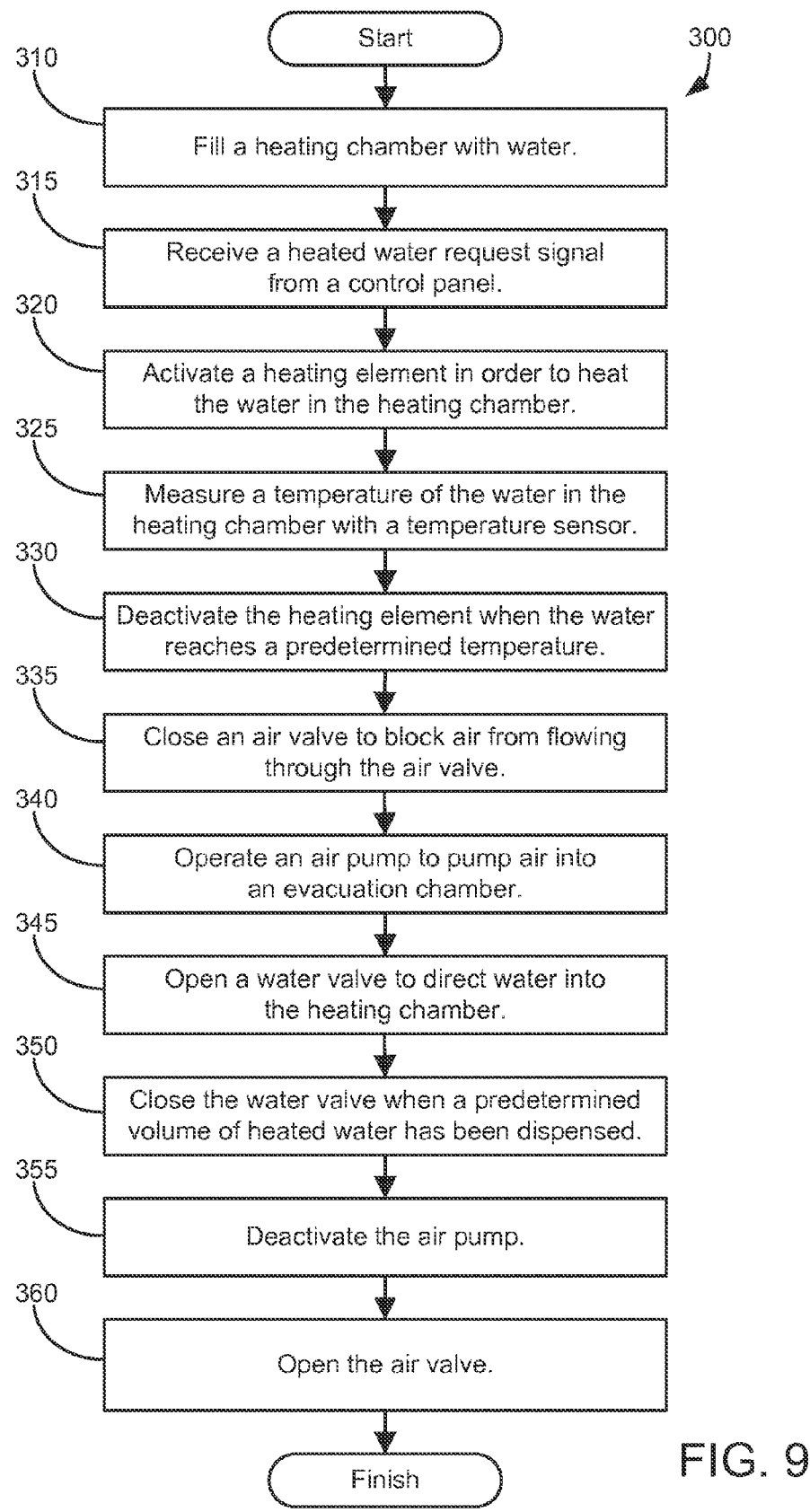
FIG. 9 illustrates a method for operating a water heating assembly of a refrigerator appliance according to an exemplary embodiment of the present subject matter.

FIGS. 5, 6 and 7 provide schematic views of a dispensing operation of water heating assembly 200. FIG. 9 illustrates a method 300 for operating a water heating assembly of a refrigerator appliance according to an exemplary embodiment of the present subject matter. Method 300 can be used to operate any suitable water heating assembly. For example, method 300 may be used to operate water heating assembly 160 of refrigerator appliance 100 (FIG. 1) and/or water heating assembly 200 (FIG. 2). In particular, controller 260 of water heating assembly 200 may be programmed or configured to implement method 300. Utilizing method 300, a performance of water heating assembly 200 can be improved, e.g., despite backpressure downstream of water heating assembly 200. Method 300 is discussed in greater detail below with reference to FIGS. 5, 6 and 7.

At step 310, heating chamber 216 is filled with water. As an example, controller 260 can actuate water valve 254 to the open arrangement in order to initiate a flow of water into heating chamber 216 through inlet conduit 230 and downspout 256. After a period of time, controller 260 can actuate water valve 254 to the closed arrangement, e.g., when heating chamber 216 of tank 210 is full of water as shown in FIG. 5. During step 310, air valve 250 can be in the open configuration. With air valve 250 in the open configuration air from heating chamber 216 can flow through flow conduit 219 to expansion chamber 218. In such a manner, air valve 250 can hinder pressurization of air in heating chamber 216 and/or expansion chamber 218 during step 310.

At step 315, a heated water request signal is received by controller 260, e.g., from control panel 140 of refrigerator 100. As an example, a user of refrigerator appliance 100 can actuate a button on control panel 100 to generate the heated water request signal at control panel 140 during step 315. The heated water request signal can correspond to an activation signal for water heating assembly 200, e.g., that starts heating of water by water heating assembly 200.

In response to the heated water request signal, controller 260 can open air valve 250 or verify that air valve 250 is open prior to step 320. With air valve 250 in the open configuration, water can flow into expansion chamber 218, e.g., due to thermal expansion of water at step 320, without pressurizing heating chamber 216 and/or evaporation chamber 218. As discussed above, air valve 250 permits air flow out of expansion chamber 218 through vent 242 in the open configuration.

At step 320, controller operates heater 220 in order to heat the water within heating chamber 216. As discussed above, the water within heating chamber 216 expands during step 320, and water can flow into expansion chamber 218 from heating chamber 216 via flow conduit 219 during step 320 due to such expansion as shown in FIG. 6. At step 325, controller 260 measures the temperature of water within heating chamber 216. Controller 260 can monitor the temperature of the water within heating chamber 216 at step 325 until the temperature of the water in heating chamber 216 exceeds a threshold temperature, e.g., about one hundred and eighty degrees Fahrenheit or about two hundred degrees Fahrenheit. When the temperature of the water in heating chamber 216 exceeds the threshold temperature, controller 260 deactivates heater 220 in order to stop heating water within heating chamber 216 at step 330.

At step 335, controller 260 closes air valve 250, e.g., such that air valve 250 obstructs air flow out of expansion chamber 218 through air valve 250 and vent 242. Thus, at step 335, air valve 250 is adjusted to the closed configuration such that air valve 250 obstructs airflow through vent 242. At step 340, controller 260 works or operates air pump 252, e.g., in order to direct air into expansion chamber 218. During step 340, air pumped into expansion chamber 218 by air pump 252 forces or urges water out of expansion chamber 218. Thus, at step 340, air pump 252 can remove water within expansion chamber 218 from expansion chamber 218 by pumping air into expansion chamber 218 with air valve 250 closed. In particular, air pump 252 can remove water that enters expansion chamber 218 during step 320 from expansion chamber 218 at step 340.

In addition, as water from expansion chamber 218 flows out of expansion chamber 218 into heating chamber 216 via flow conduit 219 at step 340, heated water within heating chamber 216 also flows out of heating chamber 216. In particular, heated water within heating chamber 216 can flow out of heating chamber 216 via outlet conduit 232 during step 340 due to air pump 252 forcing water from expansion chamber 218 into heating chamber 216.

Expansion chamber 218 contains a finite volume of water therein. Thus, prior to step 345, controller 260 can deactivate air pump 250 when check valve 234 closes. For example, as shown in FIG. 7, after air pump 252 has removed substantially all water from expansion chamber 218, float body 236 of check valve 234 can settle at or adjacent flow conduit 219, e.g., second opening 246 of flow conduit 219. Thus, float body 236 can hinder or block further water flow and airflow out of expansion conduit 218 through flow conduit 219. At such time, controller 260 can deactivate air pump 250. In such a manner, a particular volume of heated liquid water can be dispensed at step 340 by air pump 252. For example, expansion chamber 218 can be sized to contain sufficient water to brew a beverage. For example, expansion chamber 218 can be sized to contain at least six ounces or eight ounces of liquid water. Thus, during step 340, air pump 252 can dispense or displace at least six ounces or eight ounces of heated water from heating chamber 216 of tank 210. Controller 260 can also deactivate air pump 252 at a later time as discussed below.

At step 345, controller 260 opens water valve 254, e.g., such that water valve 254 permits a flow of water from inlet conduit 230 into heating chamber 216 through water valve 254. Heated water within heating chamber 216 also flows out of heating chamber 216 when water valve 254 is opened at step 345. In particular, water from inlet conduit 230 displaces heated water within heating chamber 216 from heating chamber 216, e.g., and dispenses such heated water through outlet conduit 232. At step 350, controller 260 closes water valve 254, e.g., when a predetermined volume of heated water has been dispensed.

At step 355, controller 260 deactivates air pump 254, e.g., if controller 260 has not already deactivated air pump 254 prior to step 245. In particular, controller 260 can deactivate air pump 254 when check valve 234 closes. In such a manner, over-pressurization of expansion chamber 218 can be avoided or limited. Air valve 250 opens at step 360, e.g., to vent expansion chamber 218.

Utilizing method 300, heated water with heating chamber 216 can be dispensed by pumping air into expansion chamber 218 with air pump 252. Air pump 252 can be configured to pump air into expansion chamber 218 at a variety of pressures and/or flow rates in order to regulate the flow of heated water out of heating chamber 216. In such a manner, heated water within heating chamber 216 can be dispensed accurately and/or precisely with air pump 252. In particular, method 300 can assist with dispensing heated water accurately and/or precisely despite backpressure downstream of water heating assembly 200. Further, heating chamber 216 can be refilled with water from inlet conduit 230, while air pump 252 is operating or after air pump 252 has been deactivated, by actuating water valve 242.

Figure 8:
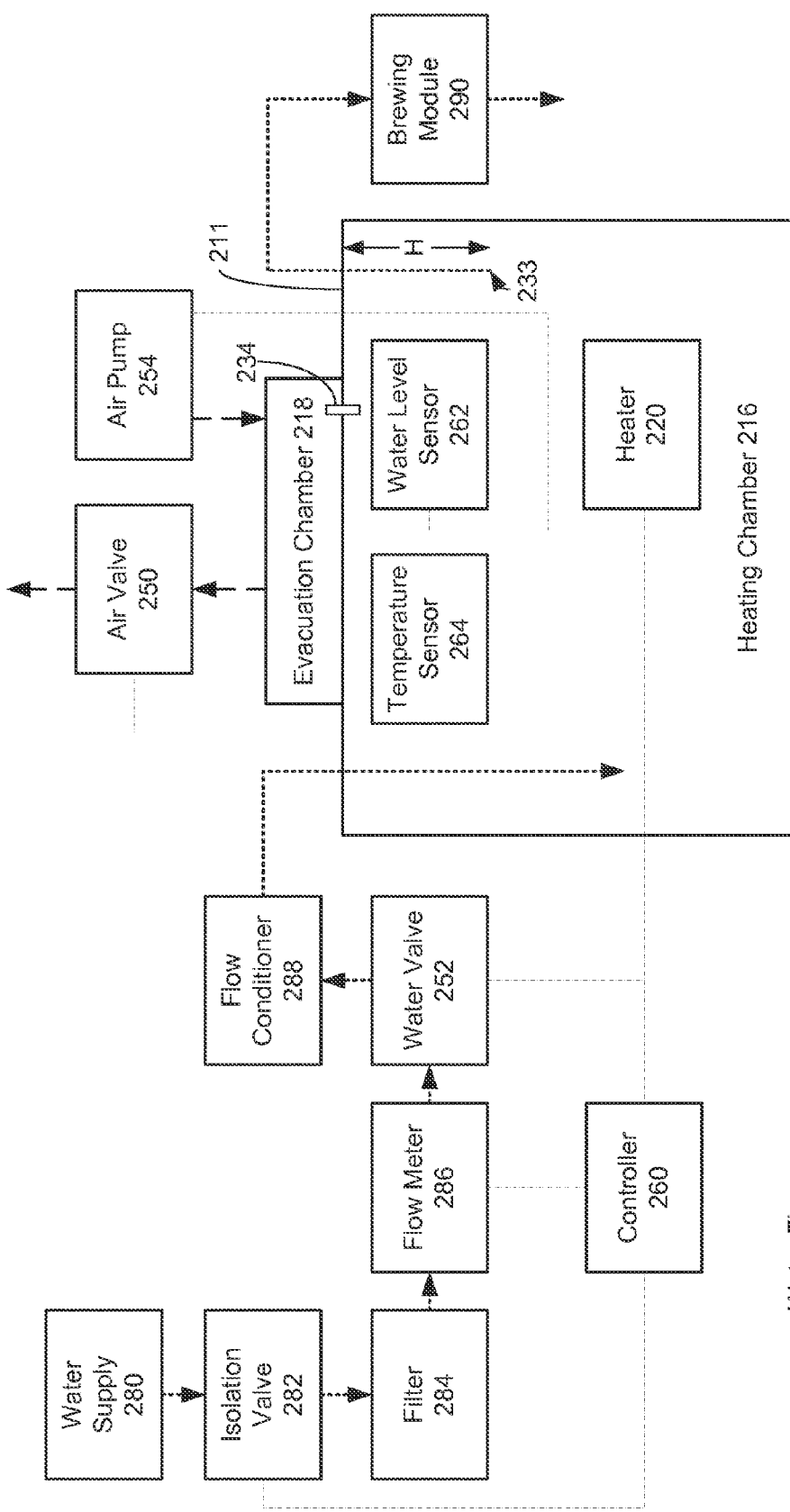
FIG. 8 provides a schematic view of certain components of the exemplary water heating assembly of FIG. 2.

FIG. 8 provides a schematic view of certain components of water heating assembly 200. In FIG. 8, water heating assembly 200 is configured for directing heated water in heating chamber 218 to a brewing module 290. In brewing module 290, such heated water may be combined with various food items or flavor additives, such as tea leaves or coffee grounds, to brew or generate a beverage for consumption. Outlet conduit 232 extends between tank 210 and brewing module 290 in order to direct heated water from heating chamber 216 of tank 210 to brewing module 290.

In addition, as may be seen in FIG. 8, water heating assembly 200 includes a water supply 280, such as a well or municipal water system. Water supply 280 directs liquid water at a premises line pressure to water heating assembly 200. As will be understood by those skilled in the art, the premises line pressure can vary, for example, between about twenty psig and about one hundred and twenty psig. Typical premises line pressures are in the range of about sixty psig.

An isolation valve 282 can selectively terminate water flow from water supply 280 to water heating assembly 200. A filter 284 filters or screens particles and/or other impurities from water flowing therethrough. Water heating assembly 200 also includes a flow meter 286 for measuring a flow rate of water flowing therethrough. Flow meter 286 can assist water level sensor 262 with determining or measuring the volume of water in heating chamber 216 and/or expansion chamber 218. A flow conditioner 288 can reduce a pressure of water passing therethrough. As an example, flow condition 288 can reduce the pressure of water from water source 280 from about sixty psig to about twenty psig.

As may be seen in FIG. 8, an inlet 233 of outlet conduit 232 is positioned within heating chamber 216. In particular, inlet 233 of outlet conduit 232 is spaced apart from a top wall 211 of tank 210, e.g., along the vertical direction V, by about a height H. Such spacing can assist with dispensing a particular volume of heated water from water heating assembly 200 as discussed in greater detail below.

Figure 10:
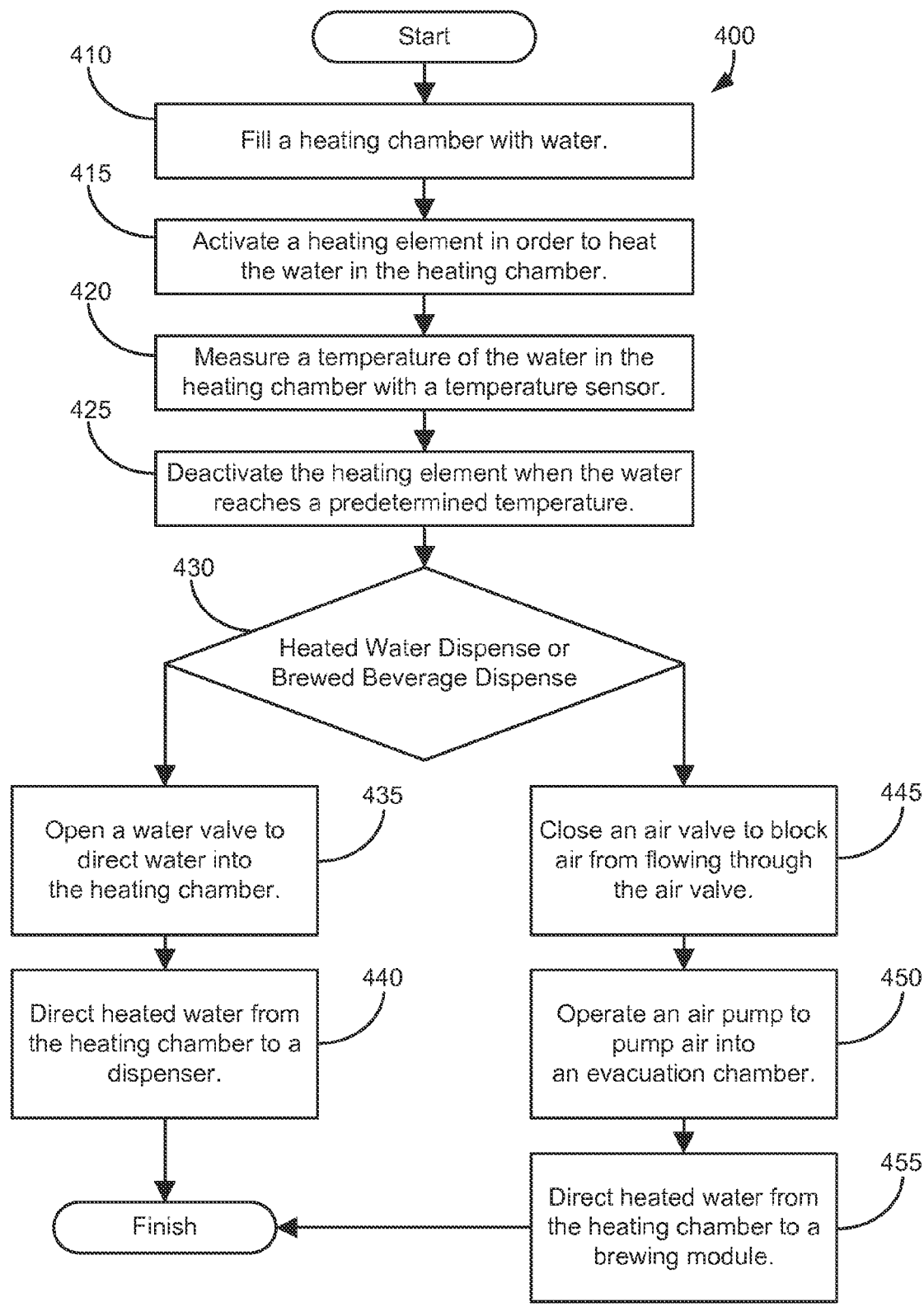
FIG. 10 illustrates a method for operating a water heating assembly of a refrigerator appliance according to another exemplary embodiment of the present subject matter.

FIG. 10 illustrates a method 400 for operating a water heating assembly of a refrigerator appliance according to another exemplary embodiment of the present subject matter. Method 400 can be used to operate any suitable water heating assembly. For example, method 400 may be used to operate water heating assembly 160 of refrigerator appliance 100 (FIG. 1) and/or water heating assembly 200 (FIG. 2). In particular, controller 260 of water heating assembly 200 may be programmed or configured to implement method 400. Utilizing method 400, a performance of water heating assembly 200 can be improved, e.g., despite backpressure downstream of water heating assembly 200. Method 400 is discussed in greater detail below with reference to FIG. 8.

At step 410, heating chamber 216 is filled with water. As an example, controller 260 can actuate water valve 254 to the open arrangement in order to initiate a flow of water into heating chamber 216 through inlet conduit 230 and downspout 256. After a period of time, controller 260 can actuate water valve 254 to the closed arrangement, e.g., when heating chamber 216 of tank 210 is full of water. During step 410, air valve 250 can be in the open configuration. With air valve 250 in the open configuration air from heating chamber 216 can flow through flow conduit 219 to expansion chamber 218. In such a manner, air valve 250 can hinder pressurization of air in heating chamber 216 and/or expansion chamber 218 during step 410.

At step 415, a heated water request signal is received by controller 260, e.g., from control panel 140 of refrigerator 100. As an example, a user of refrigerator appliance 100 can actuate a button on control panel 100 to generate the heated water request signal at control panel 140 during step 415. The heated water request signal can correspond to an activation signal for water heating assembly 200, e.g., that starts heating of water by water heating assembly 200.

At step 420, controller operates heater 220 in order to heat the water within heating chamber 216. The water within heating chamber 216 expands during step 420, and water can flow into expansion chamber 218 during step 420 due to such expansion. At step 425, controller 260 measures the temperature of water within heating chamber 216. Controller 260 can monitor the temperature of the water within heating chamber 216 at step 425 until the temperature of the water in heating chamber 216 exceeds a threshold temperature, e.g., about one hundred and eighty degrees Fahrenheit or about two hundred degrees Fahrenheit. When the temperature of the water in heating chamber 216 exceeds the threshold temperature, controller 260 can deactivate heater 220 in order to stop heating water within heating chamber 216.

At step 430, controller 260 determines whether a heated water dispense or a brewed beverage dispense was requested at step 415. The heated water dispense can correspond to a request for dispensing of heated water from the water heating assembly 200. Conversely, the brewed beverage dispense can correspond to a request for dispensing of brewed beverage from the water heating assembly 200, e.g., the brewing module 290 of water heating assembly 200. As an example, a user can select the heated water dispense at step 415 if only heated water is desired, or the user can select the brewed beverage dispense at step 425 is a flavored beverage is desired.

As will be understood by those skilled in the art, brewing module 290 can generate backpressure that affects operation of water heating assembly 200, such as water flow through heating chamber 216 and Venturi portion 248. Thus, in the brewed beverage dispense, water heating appliance 200 can experience backpressure as a result of brewing module 290. Conversely, in the heated water dispense, such backpressure is not experienced, e.g., because brewing module 290 is not activated or utilized. Thus, method 400 can assist with operating water heating assembly 200 in a manner that accounts for backpressure.

At step 435, controller 260 opens water valve 252 such that water valve 252 permits a flow of water into heating chamber 216 through inlet conduit 230 if the heated water dispense is selected at step 430. At step 440, heated water within heating chamber 216 flows out of heating chamber 216 and is dispensed, e.g., due to water from inlet conduit 230 displacing such heated water. As discussed above, when water passes through inlet conduit 230, such water also passes through Venturi portion 248. When water passes through Venturi portion 248, Venturi portion 248 draws water from expansion chamber 218 into heating chamber 216. In such a manner, Venturi portion 248 can drain expansion chamber 218, and heated water from heating chamber 216 can be dispensed during the heated water dispense.

Conversely, at step 445, controller 260 closes air valve 250, e.g., such that air valve 250 obstructs air flow out of expansion chamber 218 through air valve 250 and vent 242, if the brewed beverage dispense is selected at step 430. Thus, at step 445, air valve 250 is adjusted to the closed configuration such that air valve 250 obstructs airflow through vent 242. At step 450, controller 260 works or operates air pump 252, e.g., in order to direct air into expansion chamber 218. During step 450, air pumped into expansion chamber 218 by air pump 252 forces or urges water out of expansion chamber 218. Thus, at step 450, air pump 252 can remove water within expansion chamber 218 from expansion chamber 218 by pumping air into expansion chamber 218 with air valve 250 closed.

As water from expansion chamber 218 flows out of expansion chamber 218 into heating chamber 216 via flow conduit 219 at step 450, heated water within heating chamber 216 also flows out of heating chamber 216 and is dispensed at step 455. In particular, heated water within heating chamber 216 can flow out of heating chamber 216 via outlet conduit 232 during step 455 due to air pump 252 forcing water from expansion chamber 218 into heating chamber 216. In such a manner, air pump 252 can drain expansion chamber 218 and dispense heated water from heating chamber 216 during the brewed beverage dispense, e.g., when backpressure from brewing module 290 negates the effect of Venturi portion 248.

Method 400 can also include directing a flow of air through brewing module 290 with air pump 254 after step 455. For example, if check valve 234 is an active valve, such as solenoid valve, controller 260 can open check valve 234 and permit air from air pump to enter heating chamber 216 at step 450. Air can displace heated water within heating chamber 216 and force or urge heated water out of heating chamber 216 via outlet conduit 232, e.g., until the level of liquid in heating chamber 216 drops below the inlet 233 of outlet conduit 232. By properly selecting the height H between inlet 233 of outlet conduit 232 and top wall 211 of tank 210, air pump 254 can dispense a particular volume of heated water from heating chamber 216 and also direct air through brewing module 290 after dispensing the particular volume of heated water.

To assist a user with dispensing heated water, controller 260 can pulse or intermittently activate air pump 254 when a dispense operation of water heating assembly 200 is initiated, e.g., prior to step 340 and/or step 450. Such intermittent operation can cause droplets of water to be dispensed rather than a stream of water, and such droplets can assist the user with properly locating the container within the dispenser.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance, comprising:
a cabinet defining a chilled chamber, the chilled chamber of the cabinet configured for receipt of food items for storage, the cabinet having a door, the door configured for permitting selective access to the chilled chamber of the cabinet;
a water heating assembly comprising
a tank defining a heating chamber and an expansion chamber, the tank having a flow conduit that extends between the heating chamber and the expansion chamber, the tank also having a vent that permits air to enter and exit the expansion chamber, the expansion chamber configured for holding at least six ounces of water therein;
a check valve positioned within the expansion chamber at an opening of the flow conduit;
an air valve mounted to the tank at the vent of the expansion chamber, the air valve adjustable between an open configuration and a closed configuration, the air valve permitting a flow of air through the vent when the air valve is in the open configuration, the air valve obstructing the flow of air through the vent when the air valve is in the closed configuration;
a heating element mounted to the tank and positioned within the heating chamber of the tank;
an air pump coupled to the tank at the expansion chamber of the tank and configured for selectively directing air into the expansion chamber;
an inlet conduit configured for directing liquid water into the heating chamber of the tank;
an outlet conduit configured for directing liquid water out of the heating chamber of the tank; and
a brewing module, the outlet conduit extending between the tank and brewing module in order to direct heated water from the heating chamber of the tank to the brewing module, an inlet of the outlet conduit positioned within the heating chamber of the tank, the inlet of the outlet conduit spaced apart from a top wall of the tank such that a particular volume of heated water from the heating chamber disposed above the inlet of the outlet conduit is dispensed from the heating chamber during operation of the air pump.

2. The refrigerator appliance of claim 1, wherein the water heating assembly further comprises a water valve coupled to the inlet conduit, the water valve is configured for selectively adjusting between an open arrangement and a closed arrangement, the water valve permitting a flow of water into the heating chamber through the inlet conduit when the water valve is in the open arrangement, the water valve obstructing the flow of water into the heating chamber through the inlet conduit when the water valve is in the closed arrangement.

3. The refrigerator appliance of claim 1, wherein the expansion chamber is positioned above the heating chamber.

4. The refrigerator appliance of claim 1, wherein the vent is positioned at a top portion of the expansion chamber.

5. The refrigerator appliance of claim 1, wherein the air pump is mounted to the tank at the vent.

6. The refrigerator appliance of claim 1, wherein the check valve is a floating ball check valve.

7. The refrigerator appliance of claim 1, wherein the inlet of the outlet conduit is disposed vertically below the top wall of the tank by a height, the height selected such that air from the air pump dispenses a particular volume of heated water from the heating chamber of the tank during operation of the air pump when the check valve is open.

8. The refrigerator appliance of claim 7, wherein the check valve is a solenoid valve.

9. The refrigerator appliance of claim 8, wherein the inlet of the outlet conduit is positioned to receive air from the air pump after the particular volume of heated water is dispensed.

10. The refrigerator appliance of claim 9, the air valve is spaced apart from the check valve on the tank.

11. The refrigerator appliance of claim 1, wherein the air valve is separate from the air pump on the tank.

* * * * *